(12) United States Patent
Wang et al.

(10) Patent No.: US 11,126,146 B2
(45) Date of Patent: Sep. 21, 2021

(54) WEARABLE ELECTRONIC DEVICE

(71) Applicants: Daniel Wang, Taipei (TW); Li-Yuan Wang, Taipei (TW)

(72) Inventors: Daniel Wang, Taipei (TW); Li-Yuan Wang, Taipei (TW)

( * ) Notice: Subject to any disclaimer, the term of this patent is extended or adjusted under 35 U.S.C. 154(b) by 0 days.

(21) Appl. No.: 16/914,857

(22) Filed: Jun. 29, 2020

(65) Prior Publication Data

US 2020/0326662 A1  Oct. 15, 2020

Related U.S. Application Data

(62) Division of application No. 16/416,599, filed on May 20, 2019, now Pat. No. 10,768,581.

(30) Foreign Application Priority Data

Aug. 28, 2018 (TW) .................................. 107130213

(51) Int. Cl.
| | |
|---|---|
| *G06F 1/16* | (2006.01) |
| *G04G 17/08* | (2006.01) |
| *G04G 17/04* | (2006.01) |
| *H02J 50/10* | (2016.01) |
| *G06F 3/01* | (2006.01) |

(52) U.S. Cl.
CPC ............. *G04G 17/08* (2013.01); *G04G 17/04* (2013.01); *G06F 3/014* (2013.01); *H02J 50/10* (2016.02)

(58) Field of Classification Search
CPC ........ G06F 1/1635; G06F 1/163; G06F 1/263; G04G 17/08; G04G 19/00; G04G 19/02
See application file for complete search history.

(56) References Cited

U.S. PATENT DOCUMENTS

| | | | |
|---|---|---|---|
| 6,619,835 B2* | 9/2003 | Kita ...................... | H04B 1/385 |
| | | | 368/281 |
| 8,787,006 B2* | 7/2014 | Golko ................. | H04M 1/0254 |
| | | | 361/679.03 |
| 10,110,072 B2* | 10/2018 | Kato ...................... | G04C 10/00 |
| 10,258,280 B2* | 4/2019 | Justice ................. | A61B 5/6831 |
| 10,768,581 B2* | 9/2020 | Wang ...................... | G06F 1/263 |
| 2015/0130411 A1* | 5/2015 | Kim ........................ | G04G 19/00 |
| | | | 320/108 |
| 2016/0070296 A1* | 3/2016 | Koo ........................ | H02J 50/001 |
| | | | 361/679.03 |
| 2016/0120048 A1* | 4/2016 | Seo ...................... | H05K 5/0217 |
| | | | 600/301 |
| 2018/0210491 A1* | 7/2018 | Song ..................... | G06F 1/1656 |

(Continued)

*Primary Examiner* — Anthony Q Edwards
(74) *Attorney, Agent, or Firm* — Rosenberg, Klein & Lee

(57) ABSTRACT

A wearable electronic device includes a body having a first battery and a port electrically connected to the first battery, a band having a connector and a set of first conductors electrically connected to the connector, and a belt having at least one second battery, a set of second conductors and an input port electrically connected to the second battery. The band is connected to the port via the connector so as to be electrically connected to the body. The belt may removably attach to an outer surface of the band, and the second battery may transmit power to the first battery by combining the two sets of conductors. When the belt is removed, the power consumed by the second battery is replenished by an external power source connected to the input port, mastering the information at any time.

8 Claims, 14 Drawing Sheets

(56) References Cited

U.S. PATENT DOCUMENTS

2018/0259914 A1\* 9/2018 Chae ................... G04G 19/00
2018/0337542 A1\* 11/2018 Wang ................. G06Q 30/0635
2021/0181692 A1\* 6/2021 Rothkopf ............. G04G 21/025

\* cited by examiner

WEARABLE ELECTRONIC DEVICE

BACKGROUND OF THE INVENTION

1. Field of the Invention

The present invention relates to a wearable electronic device, and more particularly to a wearable electronic device with a detachable power unit.

2. Description of the Prior Art

With the expansion of the application range of wearable electronic devices, the function is becoming more and more powerful, and the use time continues to grow, however, the acceptable size and weight of the battery in the wearable electronic device are often limited, thus limiting the capacity of the battery. As a result, the battery capacity of the wearable electronic device is often unable to meet the needs of large or long periods of use. In the face of this situation, the wearable electronic device must use external power source to replenish the electricity in order to continue to perform the function.

There are two kinds of external power sources: fixed (wired) power supply and mobile (portable) power pack. Fixed power supply includes wall outlet and electronic equipment with USB and Lightning™ port, such as, desktop computer, notebook computer, tablet computer and so on. Lightning™ is the exclusive transmission interface specification designed and manufactured by Apple Inc. Mobile power pack is usually a rechargeable secondary battery. The fixed power supply can be charged only when the wearable electronic device is removed from the user. As for the mobile power pack, although it can be carried with you, it can only be placed in handbags, backpacks, travel bags and other personal belongings. When needed, it can be taken out and connected to the wearable electronic device through a connecting line. It can not be directly attached to the user to transmit power to the wearable electronic device, so it is not convenient to carry and use the mobile power pack.

On the other hand, since the wearable electronic device is widely used for health management, such as, detecting heart rate, blood pressure, blood oxygen, sleep state, and so on, it is necessary to be worn for nearly 24 hours for continuous detection. However, for safety and other factors, the wearable electronic device must be removed when charging and cannot be detected during charging.

The present invention mitigates and/or obviates the aforementioned disadvantages.

SUMMARY OF THE INVENTION

The primary object of the present invention is to provide a wearable electronic device which can greatly increase the amount of electricity and improve the endurance.

Another object of the present invention is to provide a wearable electronic device which has a detachable power unit that can be removed and charged separately, so that the wearable electronic device can be worn for 24 hours.

To achieve the above objects, a wearable electronic device includes a body having a first battery and a port electrically connected to the first battery; a band being connected to the body for attaching it to a user, provided with a connector and a set of first conductors electrically connected to the connector, the band being connected to the port via the connector so as to be electrically connected to the body; and a belt being provided with at least one second battery and a set of second conductors electrically connected to the second battery. The belt may removably attach to an outer surface of the band, and the second battery may transmit power to the first battery by combining the two sets of conductors.

In another embodiment, a wearable electronic device includes a body having a first battery and a first induction coil electrically connected to the first battery; a band being connected to the body for attaching it to a user, provided with a second induction coil and a set of first conductors electrically connected to the second induction coil; and a belt being provided with at least one second battery and a set of second conductors electrically connected to the second battery. The belt may removably attach to an outer surface of the band, and the second battery may transmit power to the first battery via the second induction coil induces to the first induction coil by combining the two sets of conductors.

In another embodiment, a wearable electronic device includes a body having a first battery and a port electrically connected to the first battery; and a band being connected to the body for attaching it to a user, provided with at least one second battery and a connector electrically connected to the second battery. The second battery may transmit power to the first battery via the connector electrically connected to the port.

In another embodiment, a wearable electronic device includes a body having a first battery and a first induction coil electrically connected to the first battery; and a band being connected to the body for attaching it to a user, provided with at least one second battery and a second induction coil electrically connected to the second battery. The second battery may transmit power to the first battery via the second induction coil induces to the first induction coil.

In some examples, the first conductors and the second conductors have mutually attractive magnetism, or make a snap button that can be fastened to each other, so that the belt is removably attached to the outer surface of the band.

In some examples, the band or the belt may include an input port electrically connected to the second battery, and the second battery restores electricity by an external power source connected to the input port.

In some examples, the band or the belt may include a third induction coil electrically connected to the second battery, and the second battery restores electricity by a wireless charger coupled to the third induction coil.

In some examples, the band or the belt may include an output port electrically connected to the second battery, which enables the second battery to supply power to an electronic device connected to the output port.

In some examples, the band or the belt may include several slots for plugging-in and pulling-out of the second battery.

In some examples, at least one of the slots is provided for insertion of a wearable electronic device peripheral.

In some examples, both sides of the body may respectively include a joint portion, the port is disposed at a bottom of the body, the band has a bearing area and two wings, the connector is disposed on the bearing area, the wings are connected to both sides of the bearing area, a free end of each wing is formed with a joint that is engaged with the joint portion, which makes the body maintained on the bearing area, so that the connector is connected to the port.

In some examples, both sides of the body may respectively include a joint portion, the port is disposed at the lateral side of the body, the band has a bearing area and two wings, the wings are connected to both sides of the bearing area, a free end of each wing is formed with a joint, the band is further provided with a connecting line electrically connected to the first conductors, the connector is connected to a free end of the connecting line, so that the connector is connected to the port.

In some examples, the port is disposed at one side of the body, and the body has a hole on the opposite side of the port, the connector is disposed at one end of the band and is connected to the port, the other end of the band passes through the hole and reverses back, which is detachably combined with the body of the band.

In some examples, the port is disposed at one side of the body, the band is provided with two strips, the connector is disposed at an inner end of one of the two strips, and the first conductors are arranged on the strip where the connector is located.

In some examples, both sides of the body may respectively include a joint portion, the band has a bearing area and two wings, the second induction coil is disposed at the bearing area, the wings are connected to both sides of the bearing area, a free end of each wing is formed with a joint that is engaged with the joint portion, which makes the body maintained on the bearing area.

In some examples, the body may include a sensor, the bearing area of the band is defined with an aperture, and the sensor detects the physical condition of the user via the aperture.

The wearable electronic device of the present invention can load more or more large-capacity batteries through the band or belt, which can greatly increase the amount of electricity and meet its needs under large or long periods of use. Moreover, the belt can be easily removed and charged, so that the wearable electronic device can be worn for 24 hours, regardless of the site and no time limit, at any time to master the information.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

Figure 1A:
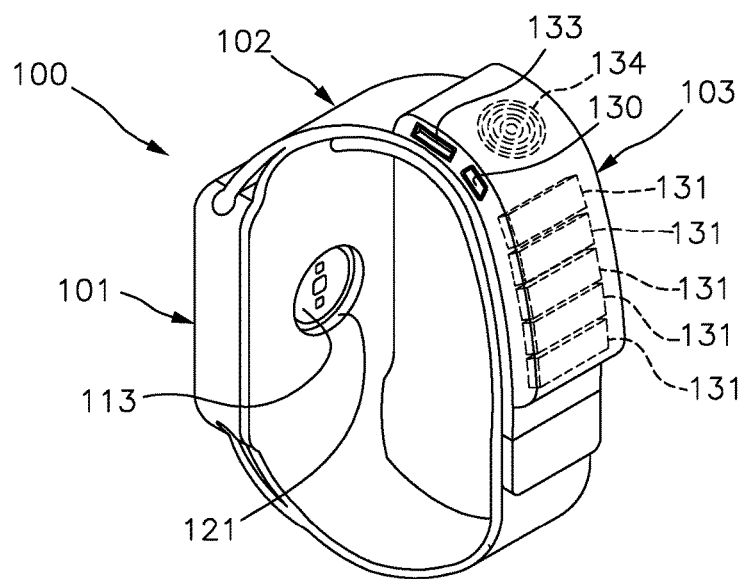
FIG. 1A is a perspective view in accordance with the first embodiment of the present invention.
Figure 1B:
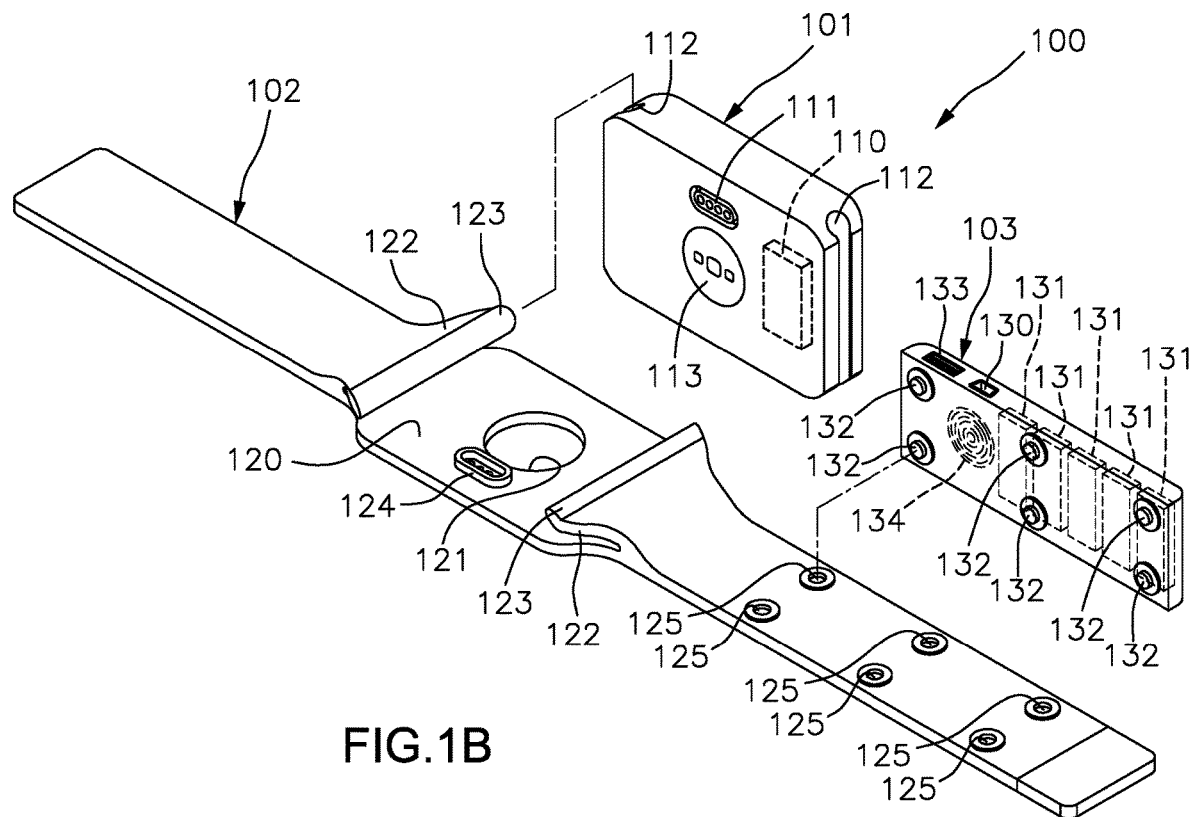
FIG. 1B is an exploded view of FIG. 1A.

Referring to FIGS. 1A and 1B, a wearable electronic device 100 in accordance with a first embodiment of the present invention comprises a body 101 having a first battery 110 to supply the power required for the operation of the body 101. The body 101 also includes a port 111 and two joint portions 112. The port 111 is disposed at the bottom of the body 101 and is electrically connected to the first battery 110. The joint portions 112 are formed at both sides of the body 101. The function of the port 111 and the joint portions 112 is left to be described later.

The wearable electronic device 100 further comprises a band 102 for attaching the body 101 to a user. The band 102 may be made into a long strip by materials such as fluoroelastomer, leather, nylon ribbon, etc., so that the band 102 is flexible and surrounds the wrist, arm, chest, waist, leg, neck or head of the user. Both ends of the band 102 use known techniques, such as magnets, buckles, Velcro™ etc., so that the wearable electronic device 100 can be removably attached to the user. Since the technique of combining both ends of the band 102 with each other is conventional, it is unnecessary to further explain.

The band 102 has a bearing area 120 in the middle of its length to load the body 101. The middle of the bearing area 120 is defined with an aperture 121, which enables a sensor 113 carried by the body 101 to detect the heart rate, blood pressure, blood oxygen, sleep state, etc., of the user through the aperture 121, so that the user do not need to wear other external sensors for health management.

The band 102 also includes two wings 122 connected to both sides of the bearing area 120. A free end of each wing 122 is formed with a joint 123 that is engaged with the joint portion 112 of the body 101. The joint portions 112 shown in the figure are dovetail grooves, so the joints 123 are dovetail joints, which are combined with each other by tenon technology, and other known techniques, such as pin joint, may also be used, without the limitation of the embodiments of the accompanying drawings.

The band 102 further includes a connector 124 and a set of first conductors 125. The connector 124 is disposed on the bearing area 120 and is connected to the port 111 when the body 101 is properly installed in the bearing area 120, so as to make the body 101 electrically connected to the band 102. The first conductors 125 are disposed on the band 102 and are electrically connected to the connector 124. The port 111 and the connector 124 shown in FIG. 1B are illustrated by Garmin® commodity exclusive transmission interfaces, and other types of transmission interfaces can also be used, without the limitation of the embodiments of the accompanying drawings.

Another important part of the invention is that the wearable electronic device 100 includes a belt 103 that is a detachable power unit having one or more second batteries 131, an input port 130 and a set of second conductors 132 electrically connected to the second battery 131. The second battery 131 is flexible to be bent along with the belt 103, or, as shown in the figure, the belt 103 can be freely bent without the influence of the second battery 131 by using a plurality of non-flexible batteries. The input port 130 is used to connect an external power source, such as, wall outlet, mobile power pack, or another electronic device, such as, desktop computer, notebook computer, tablet computer, smart phone, and so on, so as to charge the second battery 131. The second conductors 132 are disposed on the belt 103, and the first conductors 125 and the second conductor 132 have mutually attractive magnetism, or make a snap button that can be fastened to each other, so that the belt 103 can be removably attached to the outer surface of the band 102. At the same time, an electrical connection is generated between the band 102 and the belt 103. The electricity of the second battery 131 is transmitted to the first battery 110 through the second conductor 132, the first conductor 125, the connector 124 and the port 111, so as to replenish the electricity consumed by the first battery 110 and improve the endurance of the wearable electronic device 100. Moreover, when the belt 103 is removed, the power consumed by the second battery 131 can be replenished by an external power source (not shown) connected to the input port 130, so that the wearable electronic device 100 can still be worn for 24 hours while charging, regardless of the site and no time limit, at any time to master the information. Other designs in which the belt 103 can be freely assembled to and disassembled from the outer surface of the band 102, and the electrical connection can also be adopted, are not limited by the magnet or the snap button.

The belt 103 further includes an output port 133 electrically connected to the second battery 131, so that the second battery 131 can synchronously or separately supply power to another electronic device connected to the output port 133, such as, smart phone, smart watch, etc., when the belt 103 is removed. The body 101 may also transmit data with another electronic device via the output port 133. The input port 130 and the output port 133 can be any type of transmission interface, such as, USB port, mini USB port, micro USB port, Lightning™ port, miniaturized Lightning™ port, and so on.

Figure 2:
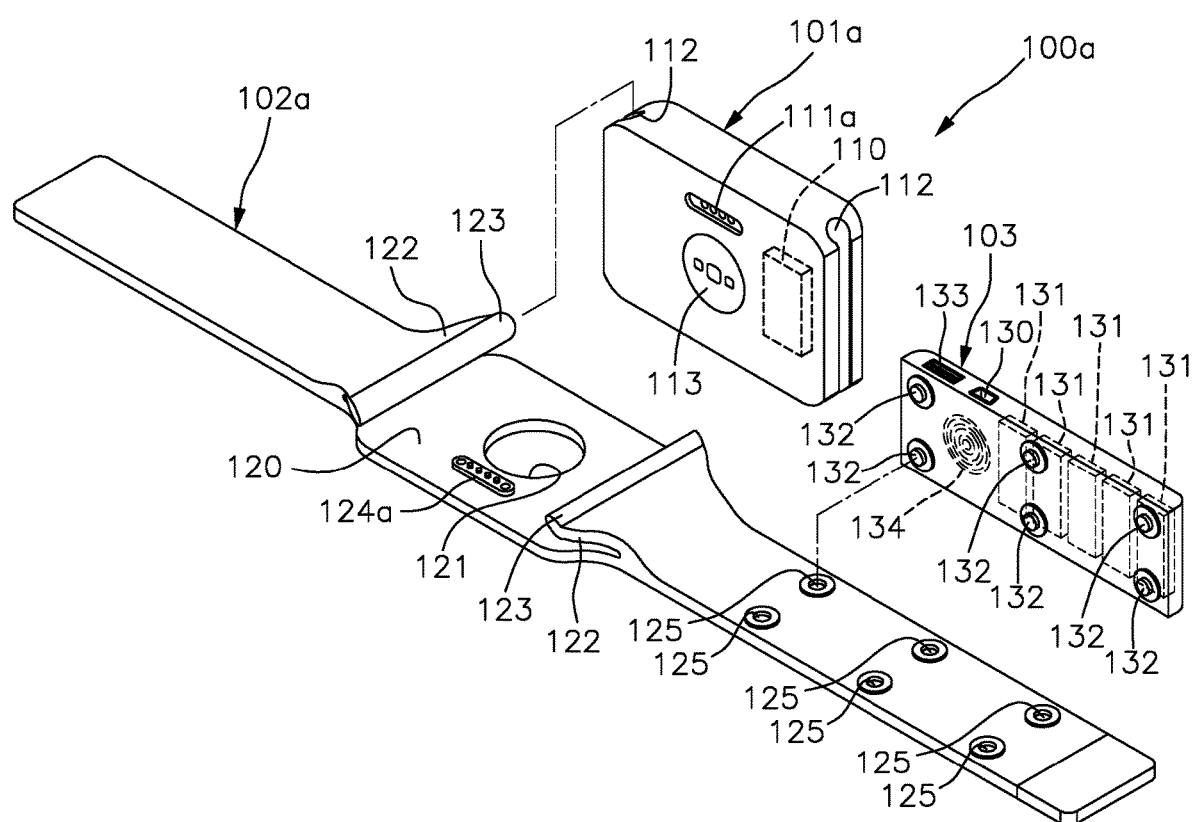
FIG. 2 is a perspective view in accordance with the second embodiment of the present invention.

In addition, as shown in FIG. 2 (second embodiment), a wearable electronic device 100a comprises a body 101a having a magnetic port 111a, and a band 102a includes a magnetic connector 124a, so as to replace the port 111 and the connector 124 of the first embodiment respectively. The second embodiment is exactly the same except that the transmission interface is different from the first embodiment, therefore, the same parts of the second embodiment are marked with the same reference sign, and the previous description of the first embodiment is also applicable to the second embodiment and will not be described again. Such a simplified description will also be presented in various embodiments of the present invention.

Figure 3:
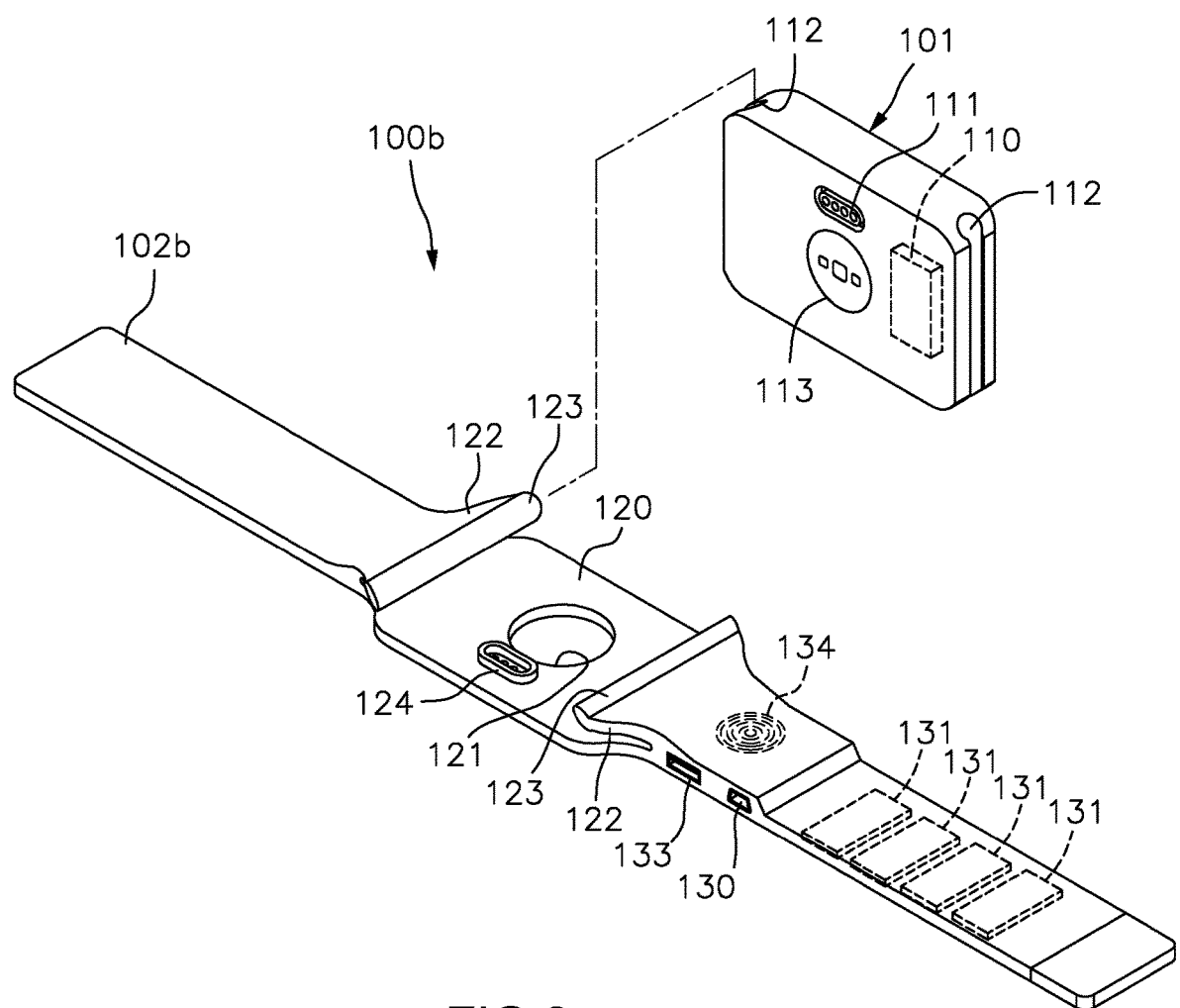
FIG. 3 is a perspective view in accordance with the third embodiment of the present invention.

The wearing electronic device 100b shown in FIG. 3 (third embodiment) transfers the input port 130, the second battery 131 and the output port 133 in the first embodiment to the band 102b, and removes the first conductor 125, the second conductor 132 and the attached belt 103 in the first embodiment. The thus formed wearable electronic device 100b can transmit the power of the second battery 131 to the first battery 110 via the connection of the connector 124 and the port 111 when the body 101 is installed in the bearing area 120, and the second battery 131 restores electricity through an external power source connected to the input port 130. The port 111 and the connector 124 of the third embodiment may be changed to the magnetic port 111a and the magnetic connector 124a of the second embodiment respectively.

Figure 4A:
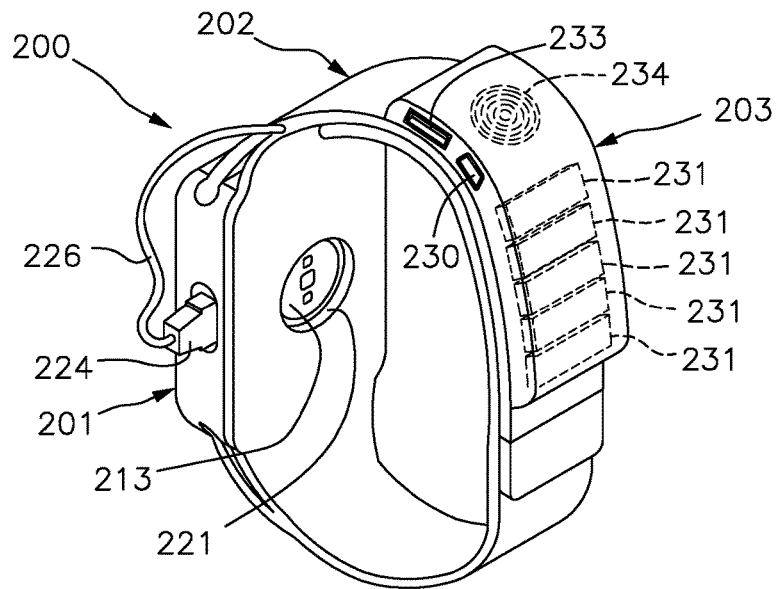
FIG. 4A is a perspective view in accordance with the fourth embodiment of the present invention.
Figure 4B:
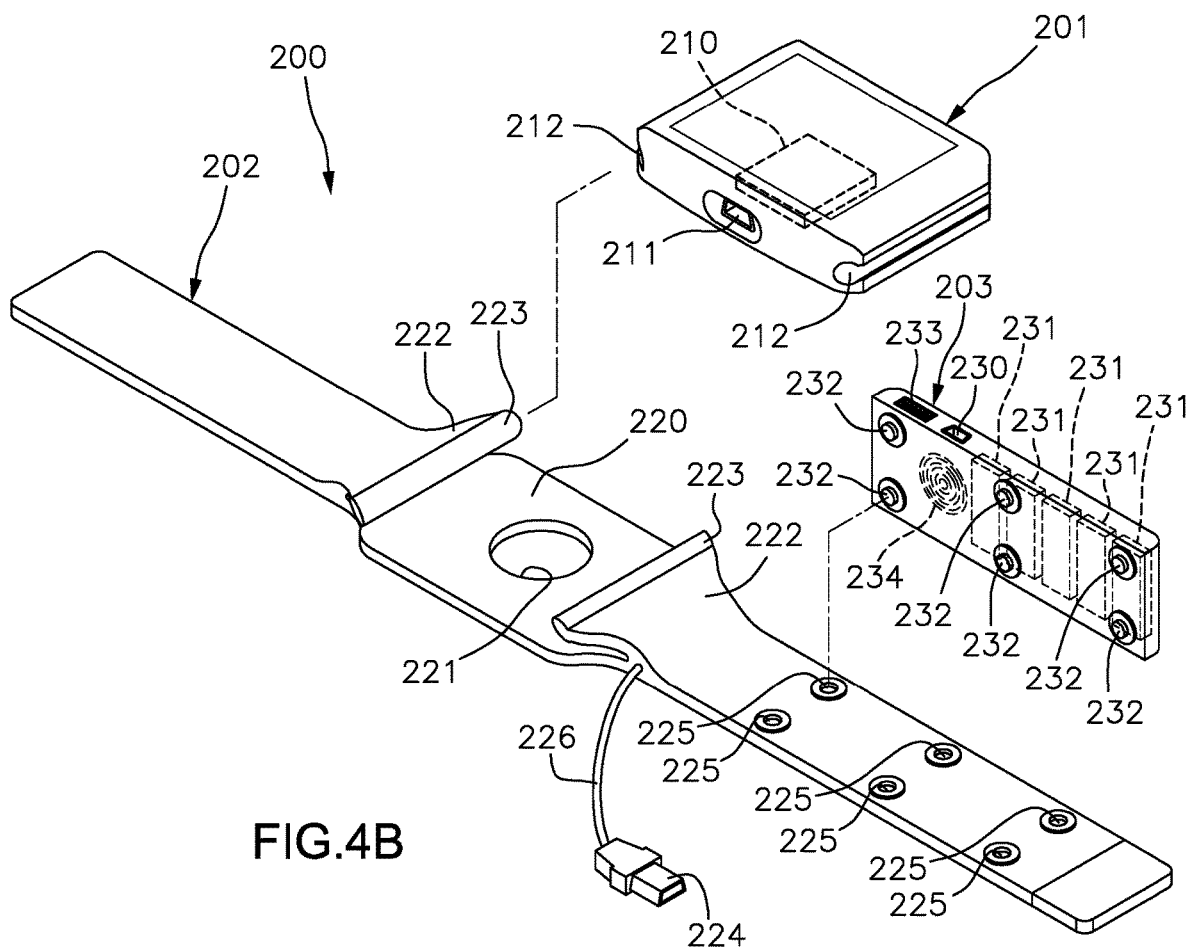
FIG. 4B is an exploded view of FIG. 4A.

A wearable electronic device 200 shown in FIGS. 4A and 4B (fourth embodiment) is similar to that of the first embodiment, which comprises a body 201, a band 202 and a belt 203. A first battery 210 and a sensor 213 are provided in the body 201. Both sides of the body 201 are formed with a joint portion 212 respectively. A lateral side of the body 201 having a port 211 electrically connected to the first battery 210. The band 202 includes a bearing area 220 having an aperture 221 in the middle thereof and two wings 222 at both sides thereof. A free end of each wing 222 is formed with a joint 223. The band 202 also includes a set of first conductors 225 and a connecting line 226 electrically connected to the first conductors 225 and provided with a connector 224 at a free end thereof. The belt 203 includes an input port 230, at least one second battery 231, a set of second conductors 232 and an output port 233, which are electrically connected with one another according to the line logic of the above belt 103. The connector 224 is inserted into the port 211 after the body 201 is installed in the bearing area 220 of the band 202, so that the first battery 210 can draw electricity from the second battery 231, so as to improve the endurance of the wearable electronic device 200. Moreover, when the belt 203 is removed, the power consumed by the second battery 231 can be replenished by an external power source connected to the input port 230. The wearable electronic device 200 thus formed can also achieve the same effect as the first embodiment.

Figure 5:
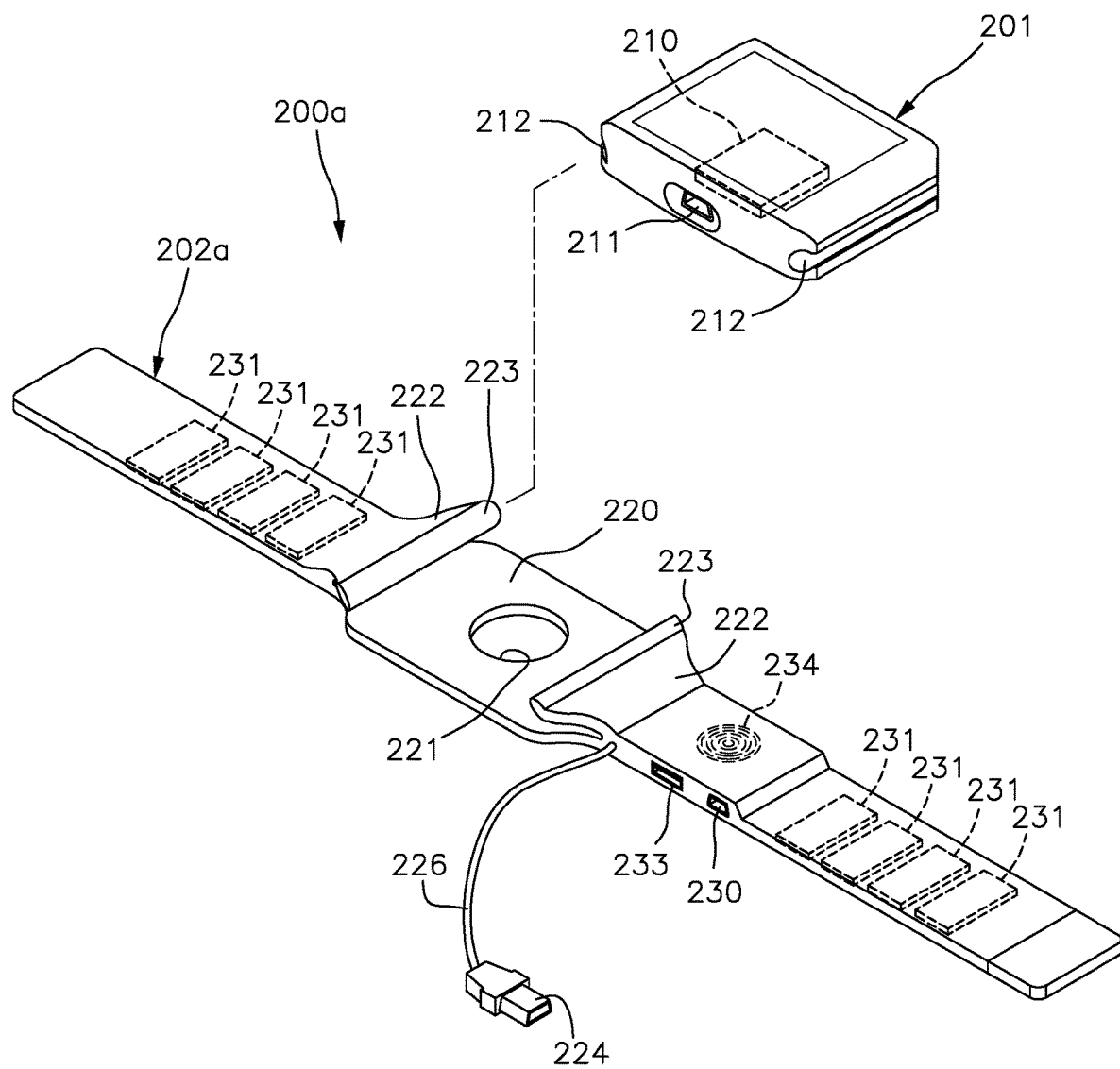
FIG. 5 is a perspective view in accordance with the fifth embodiment of the present invention.

A wearable electronic device 200a shown in FIG. 5 (fifth embodiment) transfers the input port 230, the second battery 231 and the output port 233 in the fourth embodiment to a band 202a, and removes the first conductor 225, the second conductor 232 and the attached belt 203 in the fourth embodiment. The thus formed wearable electronic device 200a can transmit the power of the second battery 231 to the first battery 210 via the connection of the connector 224 and the port 211 when the body 201 is installed in the bearing area 220, and the second battery 231 restores electricity through an external power source connected to the input port 230.

Figure 6A:
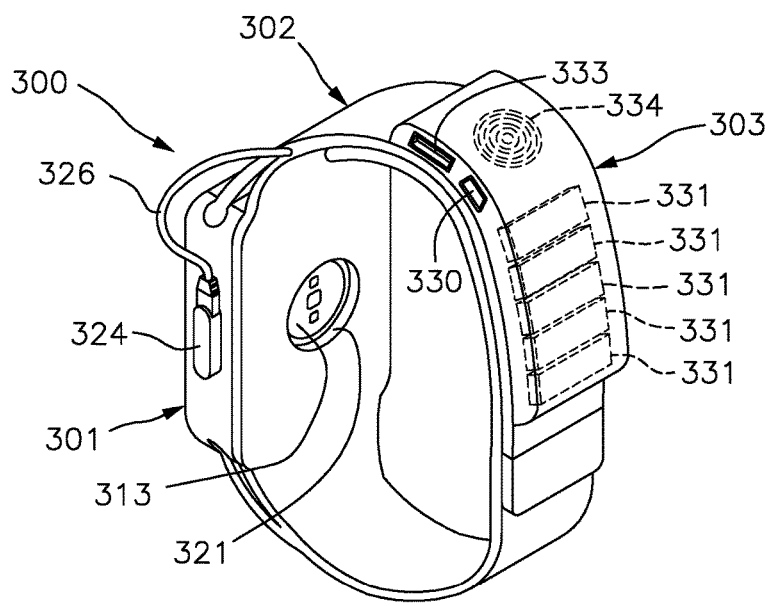
FIG. 6A is a perspective view in accordance with the sixth embodiment of the present invention.
Figure 6B:
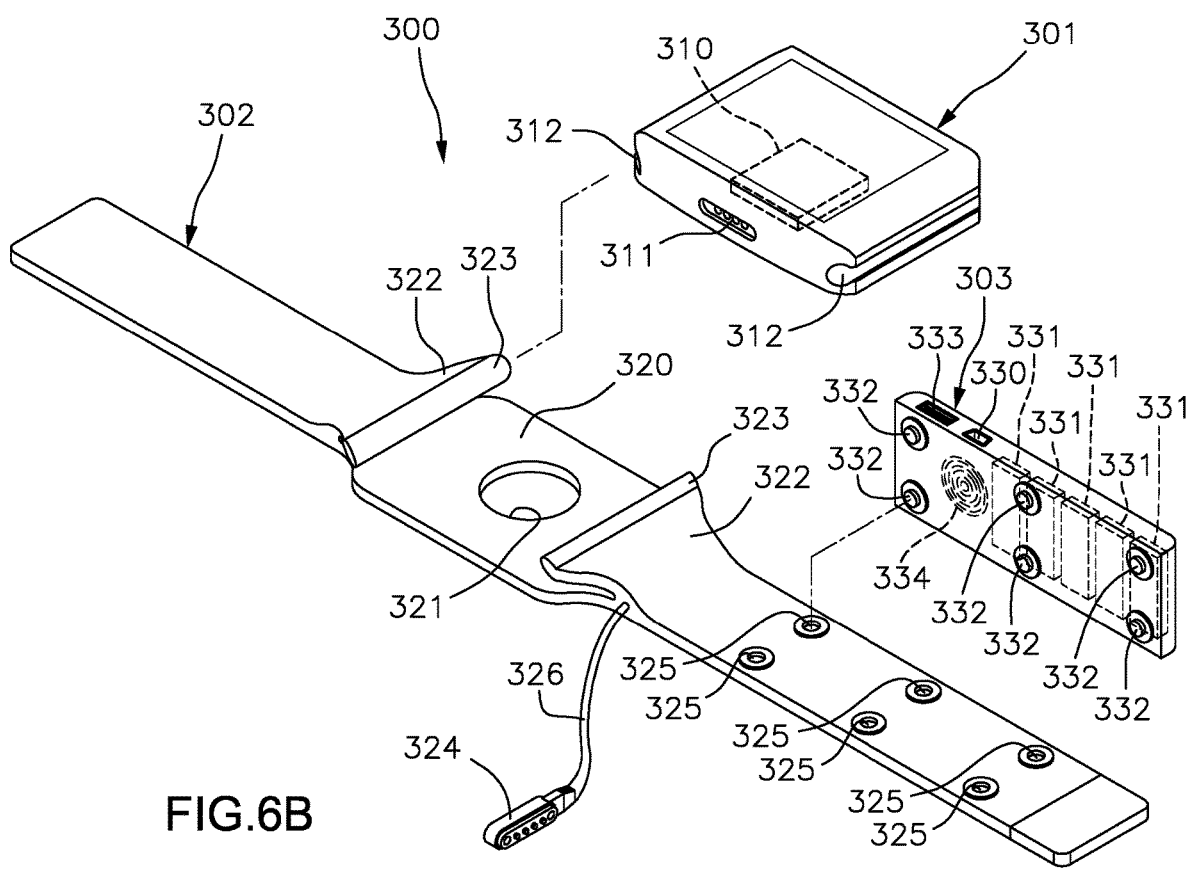
FIG. 6B is an exploded view of FIG. 6A.

A wearable electronic device 300 shown in FIGS. 6A and 6B (sixth embodiment) is a simple change in the fourth embodiment, which comprises a body 301, a band body 302 and a belt 303. The body 301 includes a first battery 310 and a magnetic port 311 electrically connected to the first battery 310 and disposed on a lateral side of the body 301. Both sides of the body 301 are formed with a joint portion 312 respectively. The body 301 also includes a sensor 313. The band 302 includes a bearing area 320 having an aperture 321 in the middle thereof and two wings 322 at both sides thereof. A free end of each wing 322 is formed with a joint 323. The band 302 also includes a set of first conductors 325 and a connecting line 326 electrically connected to the first conductors 325 and provided with a connector 324 at a free end thereof. The belt 303 includes an input port 330, at least one second battery 331, a set of second conductors 332 and an output port 333, which are electrically connected with one another according to the line logic of the above belt 103.

Figure 7A:
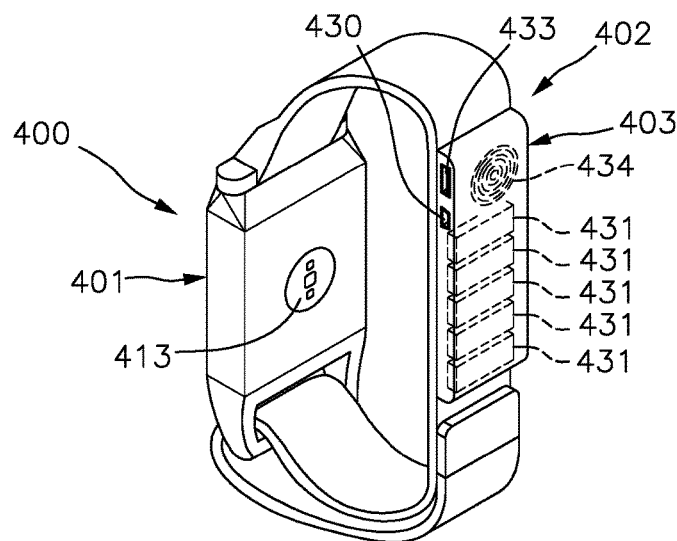
FIG. 7A is a perspective view in accordance with the seventh embodiment of the present invention.
Figure 7B:
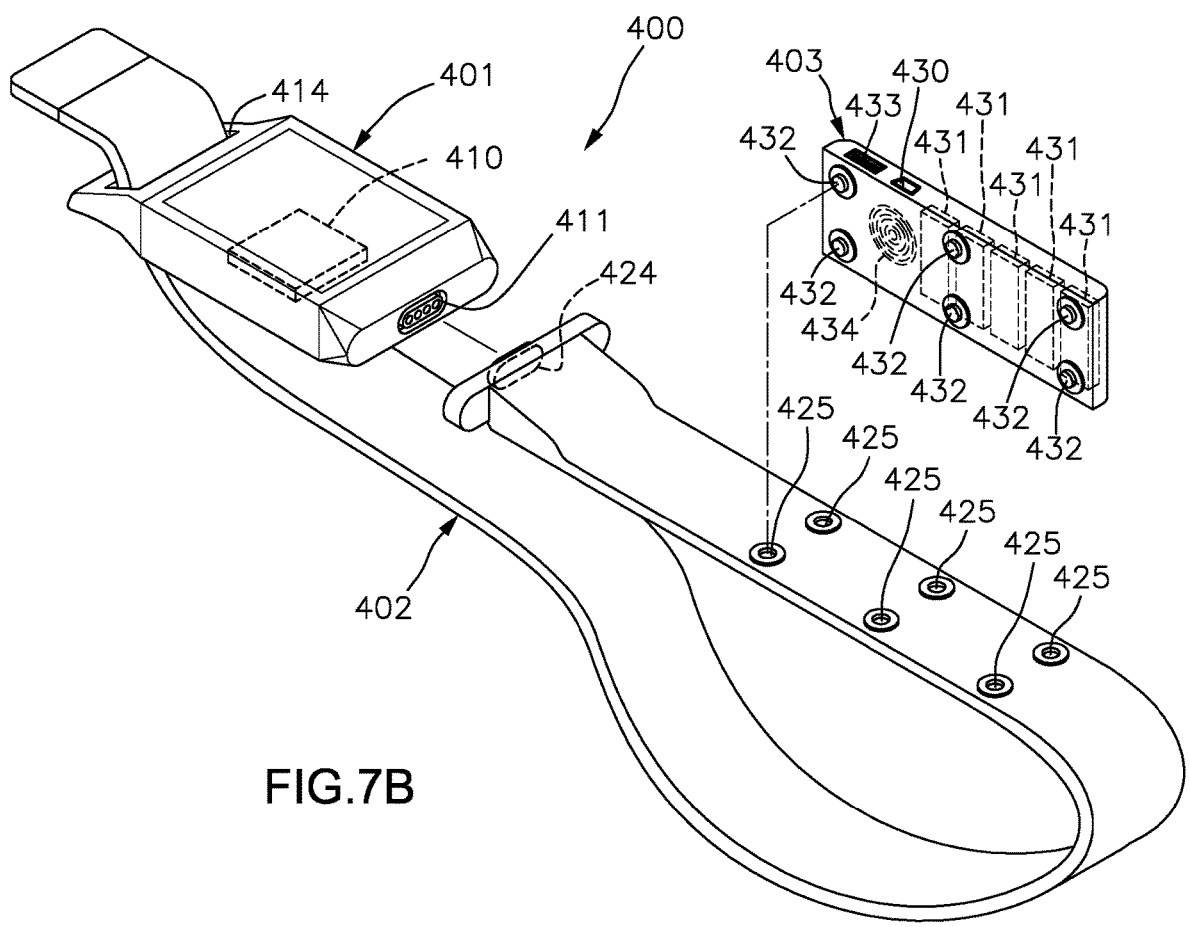
FIG. 7B is an exploded view of FIG. 7A.

In another embodiment of the present invention, a wearable electronic device 400 shown in FIGS. 7A and 7B (seventh embodiment) comprises a body 401, a band 402, and a belt 403. One side of the body 401 having a port 411 electrically connected to a first battery 410 in the body 401. The body 401 also provided with a sensor 413 and defined with a hole 414 on the opposite side of the port 411. The band 402 is provided with a connector 424 at one end thereof and a set of first conductors 425 electrically connected to the connector 424, and the connector 424 is connected to the port 411 of the body 401. The other end of the band 402 passes through the hole 414 and reverses back, which is detachably combined with the body of the band 402. The belt 403 includes an input port 430, at least one second battery 431, a set of second conductors 432 and an output port 433, which are electrically connected with one another according to the line logic of the above belt 103. The wearable electronic device 400 thus formed can also achieve the same effect as the first embodiment.

Figure 8:
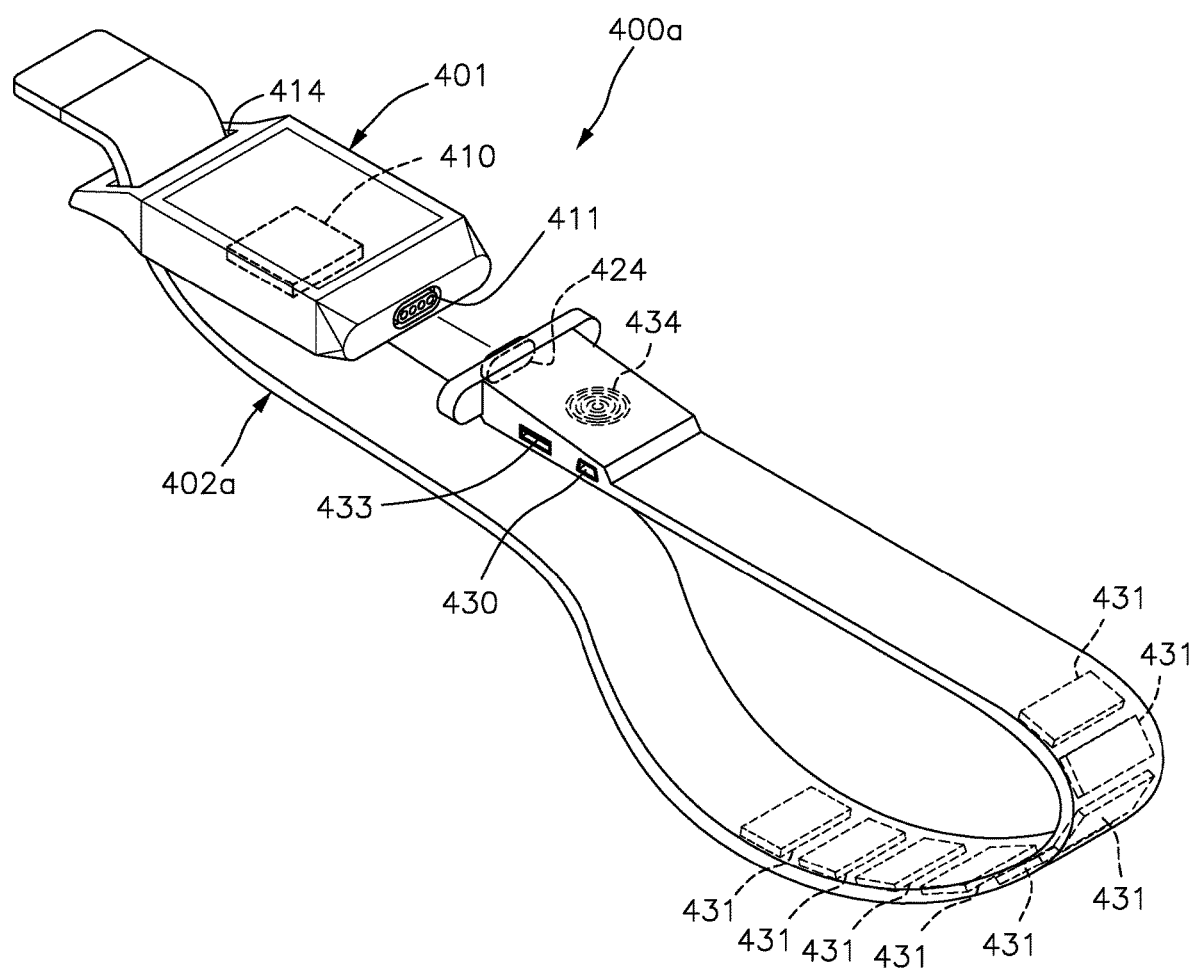
FIG. 8 is a perspective view in accordance with the eighth embodiment of the present invention.

A wearable electronic device 400a shown in FIG. 8 (eighth embodiment) transfers the input port 430, the second battery 431 and the output port 433 in the seventh embodiment to a band 402a, and removes the first conductor 425, the second conductor 432 and the attached belt 403 in the seventh embodiment. The thus formed wearable electronic device 400a can transmit the power of the second battery 431 to the first battery 410 via the connection of the connector 424 and the port 411, and the second battery 431 restores electricity through an external power source connected to the input port 430.

Figure 9A:
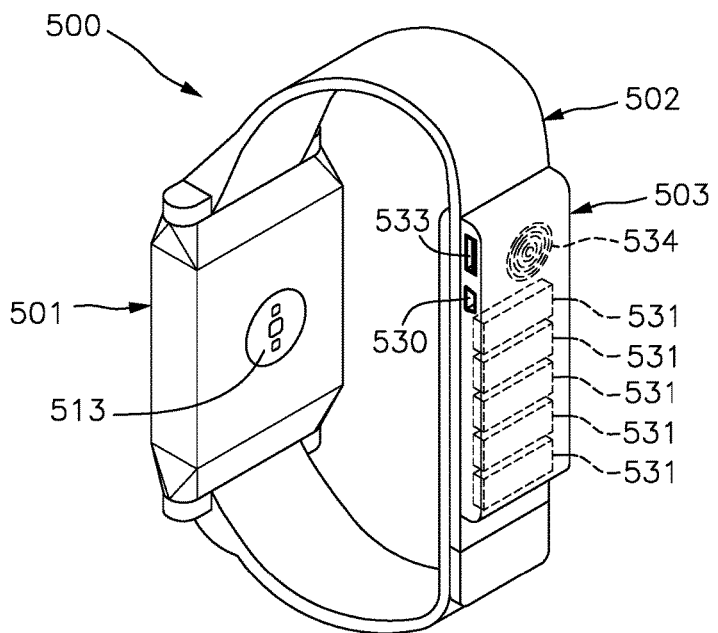
FIG. 9A is a perspective view in accordance with the ninth embodiment of the present invention.
Figure 9B:
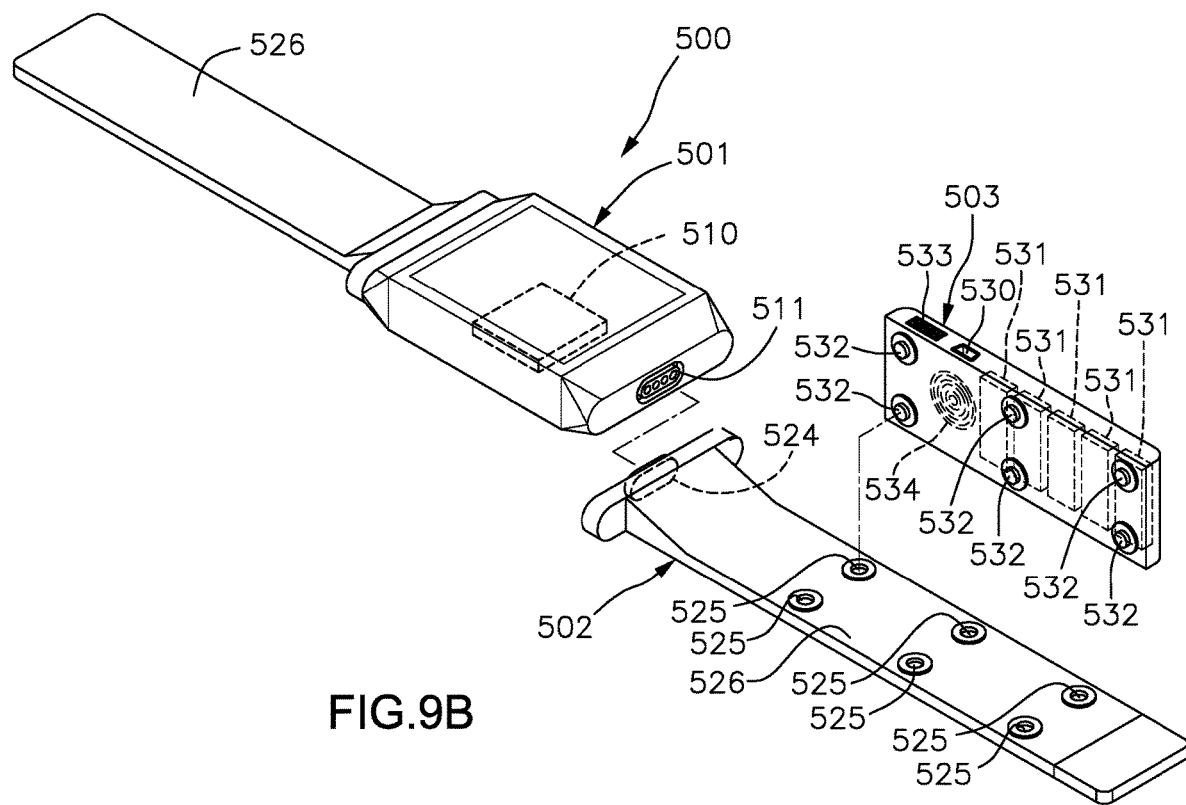
FIG. 9B is an exploded view of FIG. 9A.

A wearable electronic device 500 shown in FIGS. 9A and 9B (ninth embodiment) are changed from the seventh embodiment, which comprises a body 501, a band 502, and a belt 503. One side of the body 501 having a port 511 electrically connected to a first battery 510 carried on the body 501. The body 501 also includes a sensor 513. The band 502 includes two strips 526, the strip 526 on the right side of the figure is provided with a connector 524 at an inner end thereof for connecting to the port 511, and provided with a set of first conductors 525 electrically connected to the connector 524. The other strip 526 can be connected to the other side of the body 501 using known techniques. In this way, the body 501 is connected between the two strips 526 and the electrical connection is achieved at the same time. The belt 503 includes an input port 530, at least one second battery 531, a set of second conductors 532 and an output port 533, which are electrically connected with one another according to the line logic of the above belt 103.

Figure 10:
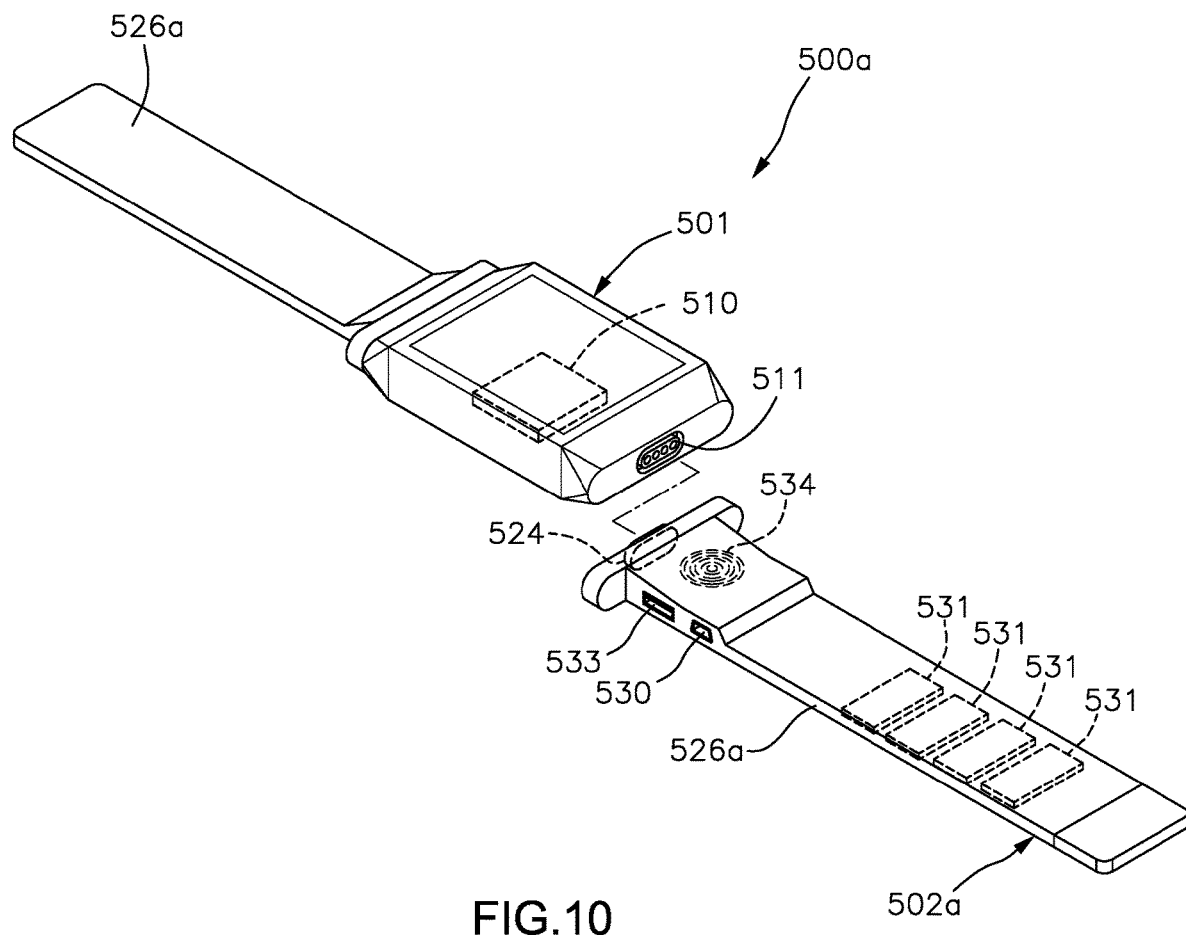
FIG. 10 is a perspective view in accordance with the tenth embodiment of the present invention.

A wearable electronic device 500a shown in FIG. 10 (tenth embodiment) transfers the input port 530, the second battery 531 and the output port 533 in the ninth embodiment to a band 502a, and removes the first conductor 525, the second conductor 532 and the attached belt 503 in the ninth embodiment. The thus formed wearable electronic device 500a can be connected to the connector 524 on the inner side of a strip 526a on the right side of the figure via the port 511 on one side of the body 501, so as to transmit the power of the second battery 531 to the first battery 510, and the second battery 531 restores electricity through an external power source connected to the input port 530.

Figure 11A:
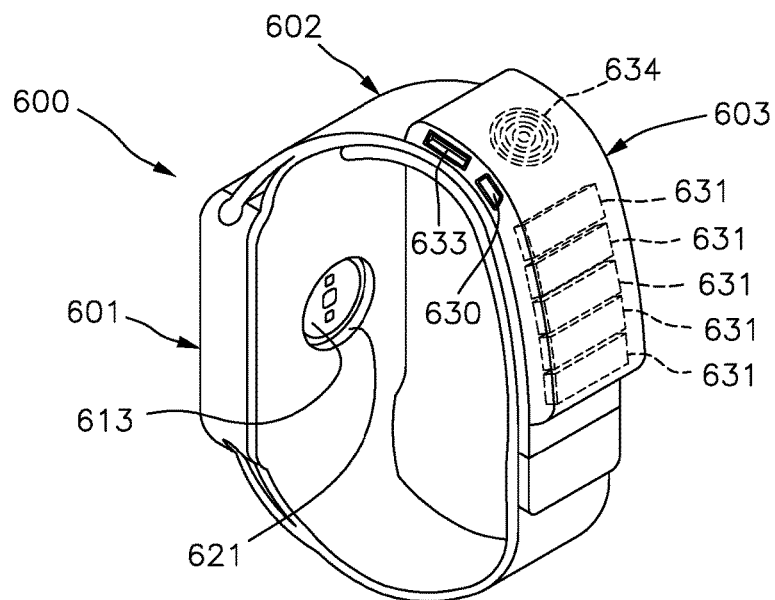
FIG. 11A is a perspective view in accordance with the eleventh embodiment of the present invention.
Figure 11B:
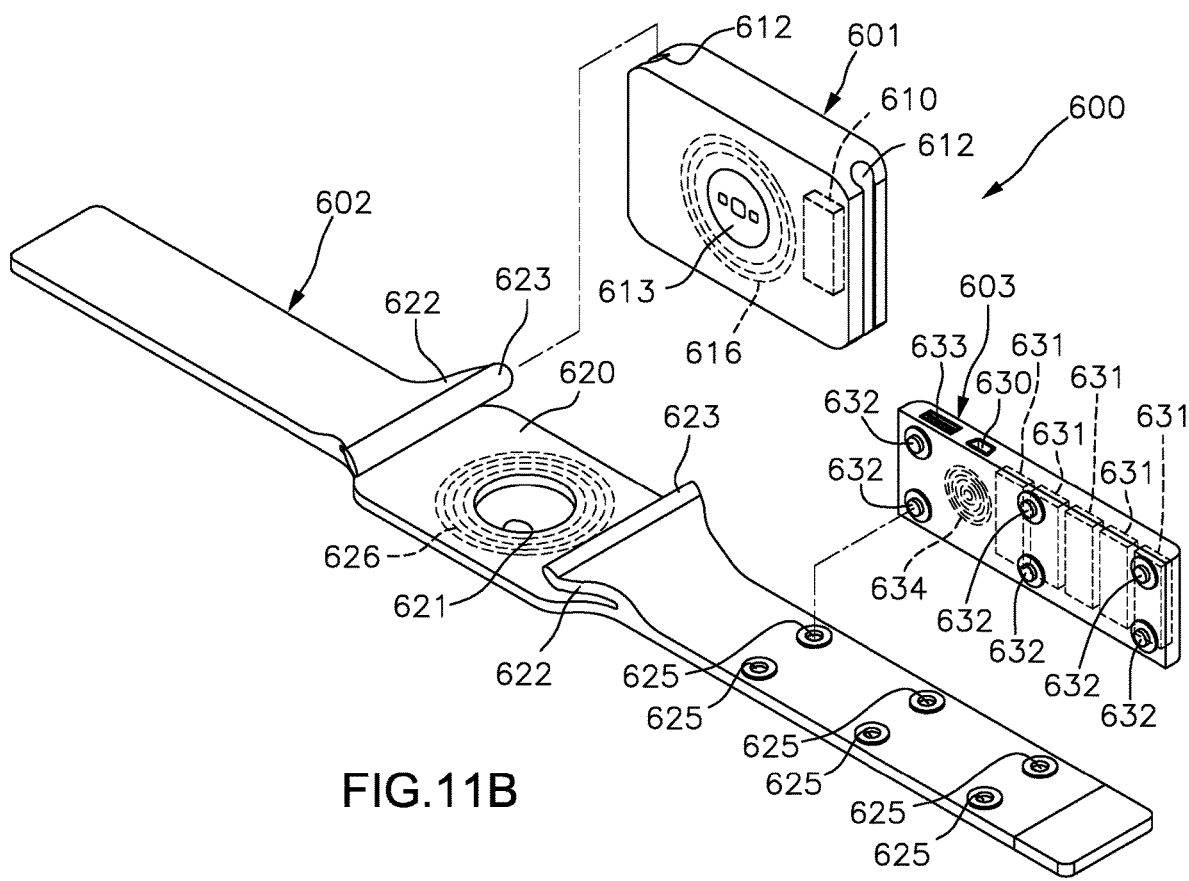
FIG. 11B is an exploded view of FIG. 11A.

In addition to electricity drawn from the second battery 131/231/331/431/531 through contact charging, the first battery 110/210/310/410/510 of the wearable electronic device 100(100a/100b)/200(200a)/300/400/(400a)/500 (500a) can also replenish electricity by induction charging (or wireless charging, contactless induction charging). Therefore, as shown in FIGS. 11A and 11B, a wearable electronic device 600 in accordance with the eleventh embodiment of the present invention comprises a body 601, a band 602 and a belt 603. A first battery 610, a sensor 613 and a first induction coil 616 electrically connected to the first battery 610 are provided in the body 601. Both sides of the body 601 are formed with a joint portion 612, respectively. The band 602 includes a bearing area 620 and a set of first conductors 625. The bearing area 620 is defined with an aperture 621 and provide with a second induction coil 626 electrically connected to the first conductors 625. Both sides of the bearing area 620 are provide with a wing 622 respectively. A free end of each wing 622 is formed with a joint 623 that can be matched with the joint portion 612. The belt 603 includes an input port 630, at least one second battery 631, a set of second conductors 632 and an output port 633, which are electrically connected with one another according to the line logic of the above belt 103. When the body 601 is installed in the bearing area 620, the second induction coil 626 will generate a magnetic field around it as a result of the current flow through which the magnetic field generates an induction current on the first induction coil 616 of the body 601, which is guided to the first battery 610, so as to achieve induction charging. Moreover, when the belt 603 is removed, the power consumed by the second battery 631 can be replenished by an external power source connected to the input port 630.

Figure 12:
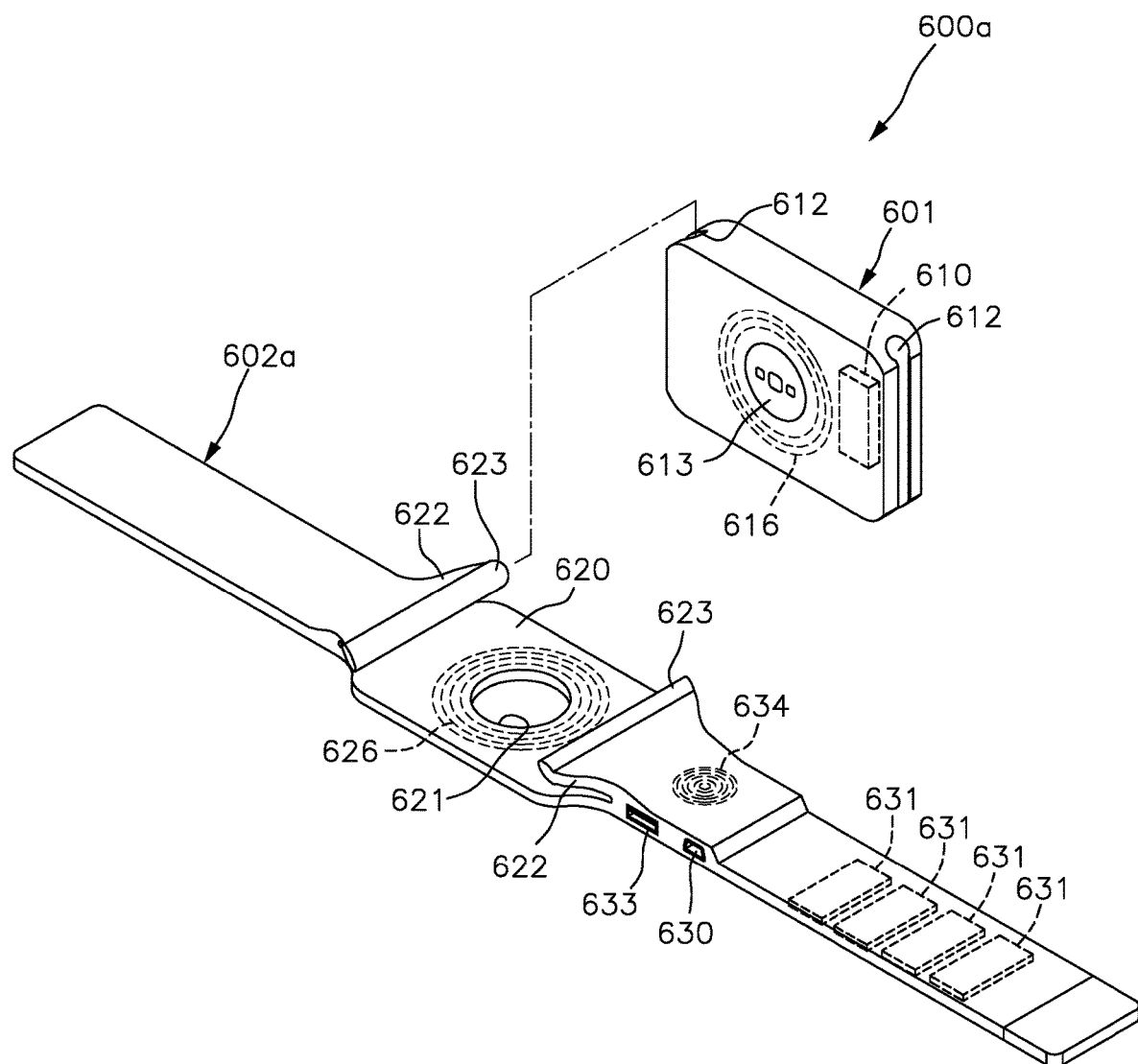
FIG. 12 is a perspective view in accordance with the twelfth embodiment of the present invention.

A wearable electronic device 600a shown in FIG. 12 (twelfth embodiment) transfers the input port 630, the second battery 631 and the output port 633 in the eleventh embodiment to a band 602a, and removes the first conductor 625, the second conductor 632 and the attached belt 603 in the eleventh embodiment. The thus formed wearable electronic device 600a can transmit the power of the second battery 631 to the first battery 610 via the second induction coil 626 induces to the first induction coil 616, and the second battery 631 restores electricity through an external power source connected to the input port 630.

Figure 13A:
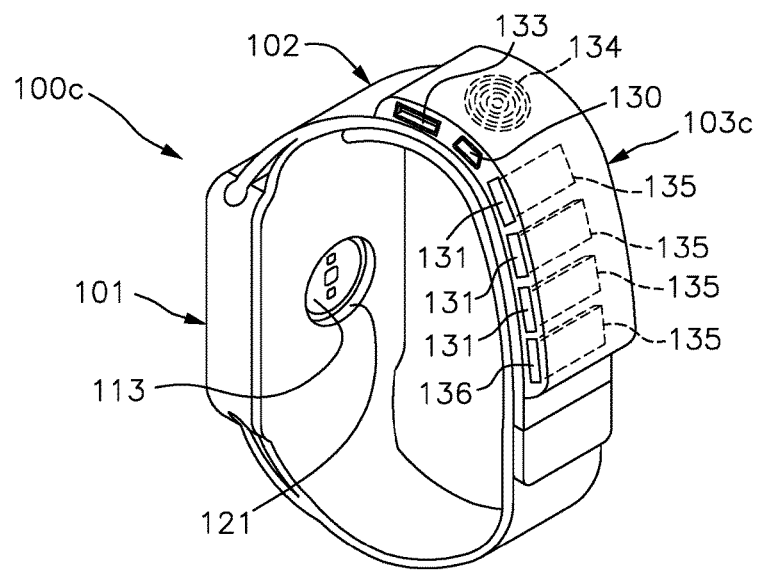
FIG. 13A is a perspective view in accordance with the thirteenth embodiment of the present invention.
Figure 13B:
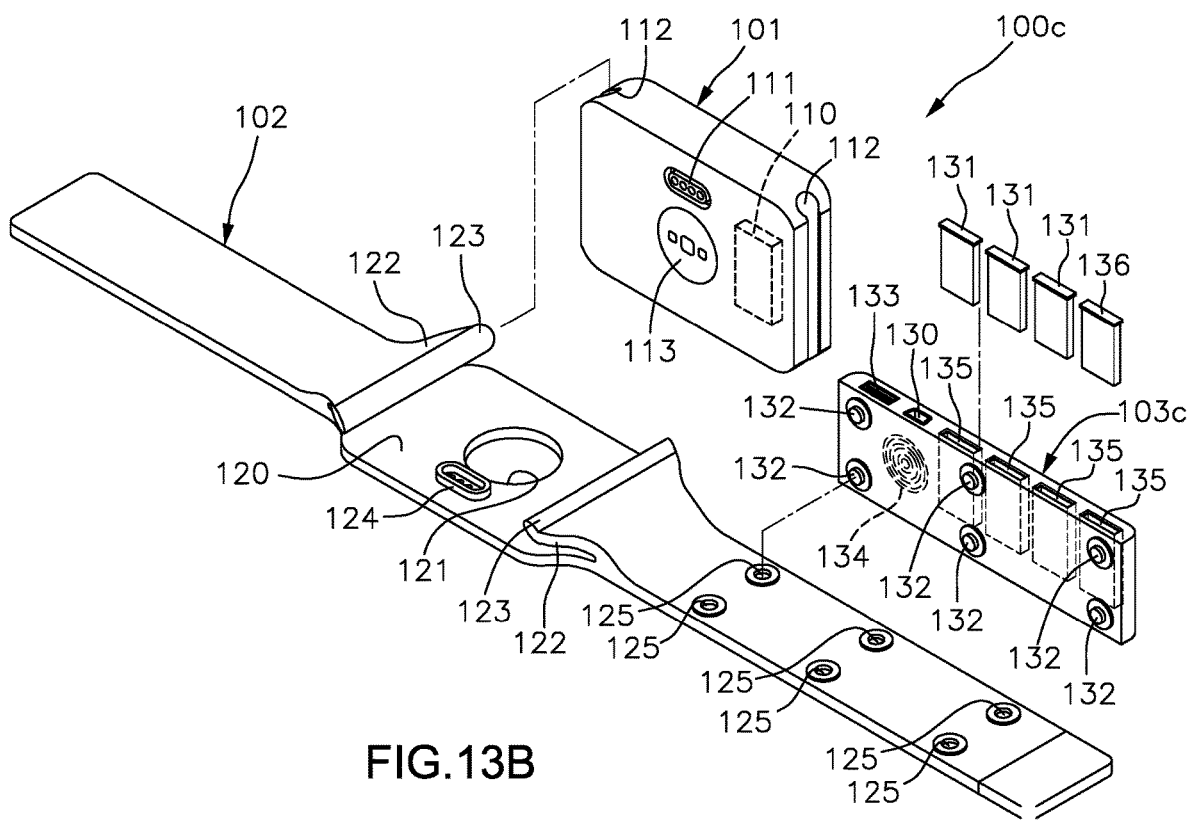
FIG. 13B is an exploded view of FIG. 13A.

In the various embodiments described above, the second battery 131/231/331/431/531/631 is fixed to the band 102 (102a/102b)/202(202a)/302/402(402a)/502(502a)/602 (602a) or the belt 103/203/303/403/503/603 and cannot be assembled and disassembled freely. However, in some embodiments of the present invention, the second battery 131/231/331/431/531/631 may also be designed as a plug-in type, that is, a wearable electronic device 100c as shown in FIGS. 13A and 13B (thirteenth embodiment) comprise a band 103c having several slots 135. The slots 135 are electrically connected to the input port 130, so that the second batteries 131 can be plugged into the slots 135 respectively. In addition to the second battery 131, at least one of the slots 135 can be provided for insertion of a wearable electronic device peripheral 136, such as, memory card, second SIM card, microphone, and so on, so as to enhance the function of the wearable electronic device.

Figure 14:
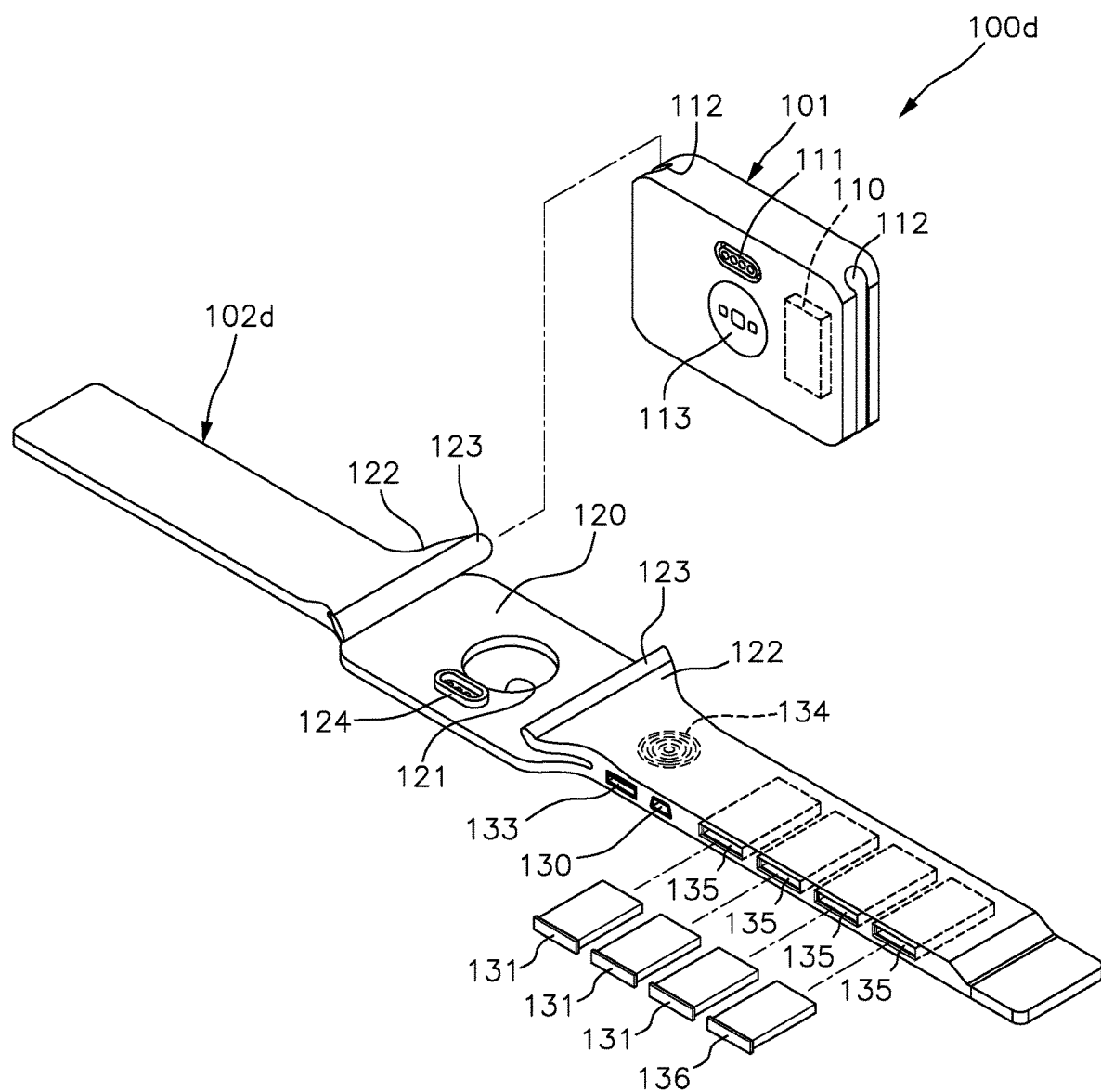
FIG. 14 is a perspective view in accordance with the fourteenth embodiment of the present invention.

A wearable electronic device 100d shown in FIG. 14 (fourteenth embodiment) transfers the input port 130, the second battery 131 and the output port 133 in the thirteenth embodiment to a band 102d, and removes the first conductor 125, the second conductor 132 and the attached belt 103c in the thirteenth embodiment. The thus formed wearable electronic device 100d can transmit the power of the second battery 131 to the first battery 110 via the connection of the connector 124 and the port 111 when the body 101 is installed in the bearing area 120 of the band 102d, and the second battery 131 restores electricity through an external power source connected to the input port 130.

Since the band 102b/102d/202a/402a/502a/602a or the belt 103(103c)/203/303/403/503/603 is strip-shaped, more or more second batteries 131/231/331/431/531/631 can be loaded, which can greatly increase the amount of electricity to enable the wearable electronic device 100(100a/100b/ 100c/100d)/200(200a)/300/400(400a)/500(500a)/600 (600a) to have a more lasting endurance to meet its needs under large or long periods of use. Moreover, the belt 103

(103*c*)/203/303/403/503/603 forms a detachable power unit that can be removed separately, and the power is replenished by an external power source connected to the input port 130/230/330/430/530/630, so as to keep the wearable electronic device worn for 24 hours, regardless of the site and no time limit, at any time to master the information.

In addition, the band 102*b*/102*d*/202*a*/402*a*/502*a*/602*a* or the belt 103(103*c*)/203/303/403/503/603 may also include a third induction coil 134/234/334/434/534/634 electrically connected to the second battery 131/231/331/431/531/631, which enables the second battery to draw electricity via a wireless charger (not shown) coupled to the third induction coil 134/234/334/434/534/634, so as to replenish the consumed electricity.

While we have shown and described various embodiments in accordance with the present invention, it should be clear to those skilled in the art that further embodiments may be made without departing from the scope of the present invention.

What is claimed is:

1. A wearable electronic device, comprising:
    a body having a first battery and a first induction coil electrically connected to the first battery; and
    a band being connected to the body for attaching it to a user, provided with at least one second battery and a second induction coil electrically connected to the second battery;
    wherein the second battery transmits power to the first battery via the second induction coil, said second induction coil induces power to the first induction coil.
2. The wearable electronic device as claimed in claim 1, wherein the band further comprising an input port electrically connected to the second battery, and the second battery restores electricity by an external power source connected to the input port.
3. The wearable electronic device as claimed in claim 1, wherein the band further comprising a third induction coil electrically connected to the second battery, and the second battery restores electricity by a wireless charger coupled to the third induction coil.
4. The wearable electronic device as claimed in claim 1, wherein the band further comprising an output port electrically connected to the second battery, which enables the second battery to supply power to an electronic device connected to the output port.
5. The wearable electronic device as claimed in claim 1, wherein the band is defined with several slots for plugging-in and pulling-out of the second battery.
6. The wearable electronic device as claimed in claim 5, wherein at least one of the slots is provided for insertion of a wearable electronic device peripheral.
7. The wearable electronic device as claimed in claim 1, wherein both sides of the body are formed with a joint portion respectively, the band has a bearing area and two wings, the second induction coil is disposed at the bearing area, the wings are connected to both sides of the bearing area, a free end of each wing is formed with a joint that is engaged with the joint portion, which makes the body maintained on the bearing area.
8. The wearable electronic device as claimed in claim 7, wherein the body is provided with a sensor, the bearing area of the band is defined with an aperture, and the sensor detects the physical condition of the user via the aperture.

\* \* \* \* \*